(12) United States Patent
Zuniga et al.

(10) Patent No.: US 6,400,126 B1
(45) Date of Patent: Jun. 4, 2002

(54) SWITCHING REGULATOR WITH MULTIPLE POWER TRANSISTOR DRIVING VOLTAGES

(75) Inventors: Marco A. Zuniga, Dublin; Charles Nickel, San Jose, both of CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

(21) Appl. No.: 09/475,713

(22) Filed: Dec. 30, 1999

(51) Int. Cl.[7] ............................................. G05F 1/40
(52) U.S. Cl. .................. 323/282; 323/224; 327/437
(58) Field of Search .......................... 327/437; 323/224, 323/282, 284, 271

(56) References Cited

U.S. PATENT DOCUMENTS

| | | | | |
|---|---|---|---|---|
| 4,906,914 A | * | 3/1990 | Ohsawa | 323/314 |
| 5,554,561 A | * | 9/1996 | Plumton | 437/193 |
| 5,929,680 A | * | 7/1999 | Lim | 327/264 |
| 5,959,442 A | * | 9/1999 | Hallberg et al. | 323/282 |

* cited by examiner

*Primary Examiner*—Shawn Riley
(74) *Attorney, Agent, or Firm*—Fish & Richardson P.C.

(57) ABSTRACT

A voltage regulator has an input terminal, an output terminal, a first transistor connecting the input terminal to an intermediate terminal, a second transistor connecting the intermediate terminal to ground, a controller that drives the first and second transistors to alternately couple the intermediate terminal between the input terminal and ground, and a filter disposed between the input terminal and the output terminal to provide a substantially DC voltage at the output terminal. The controller drives the two transistors with different gate voltage, and the two transistors can have different gate oxide layer thicknesses.

20 Claims, 3 Drawing Sheets

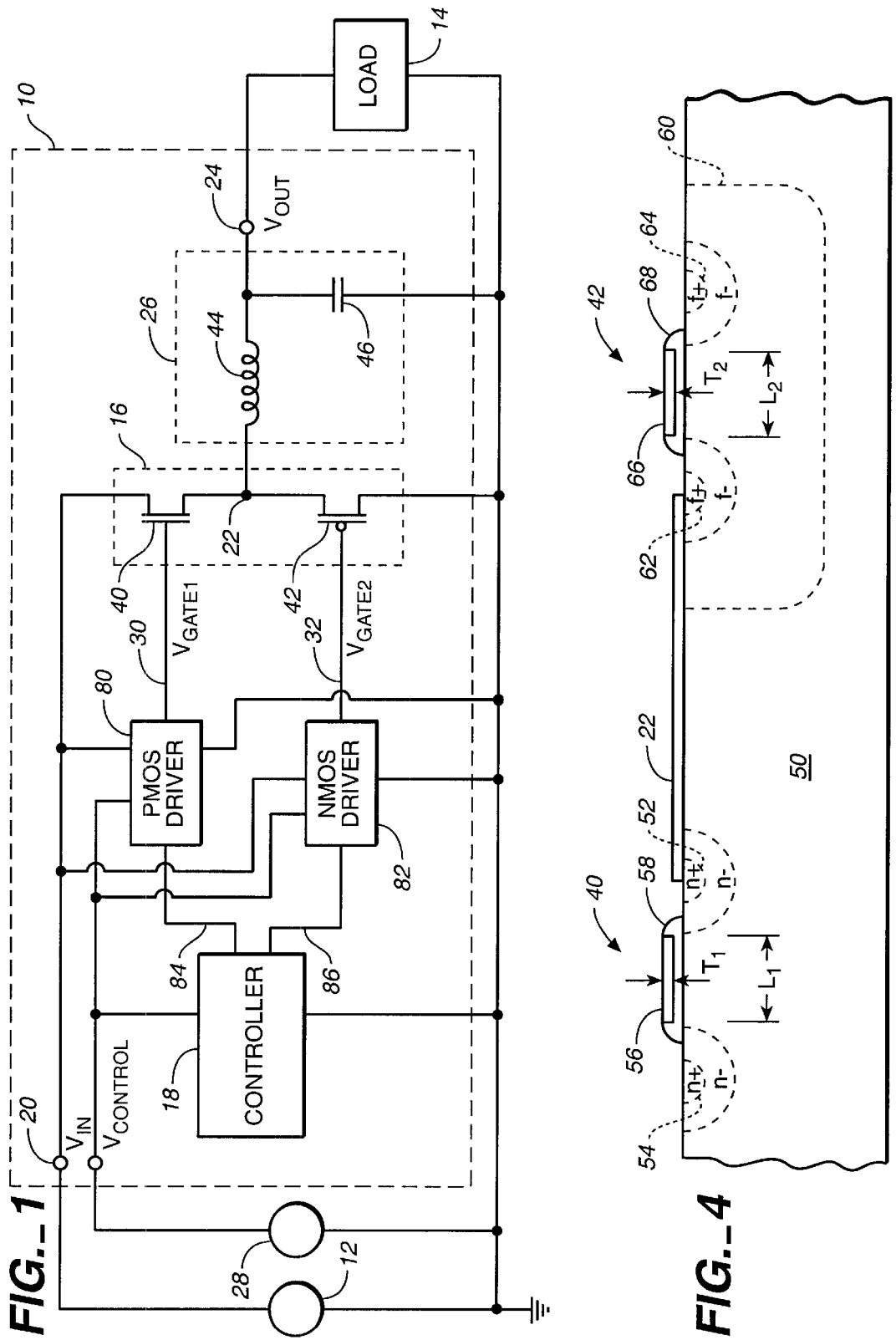

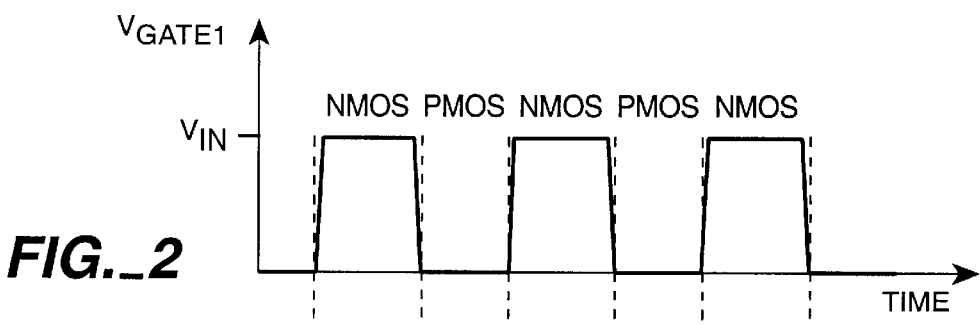
FIG._2
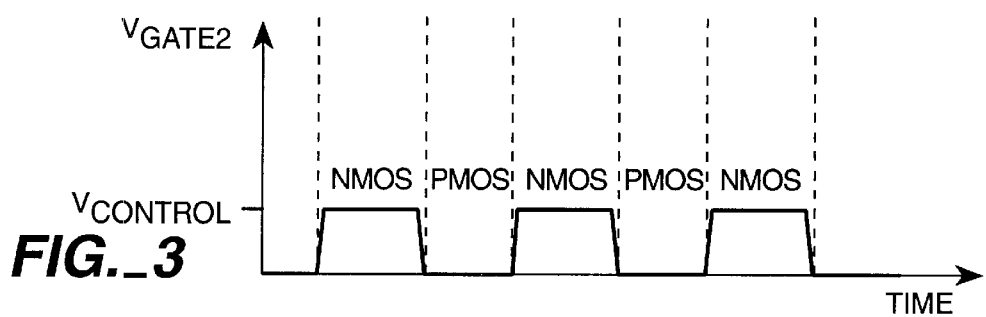
FIG._3
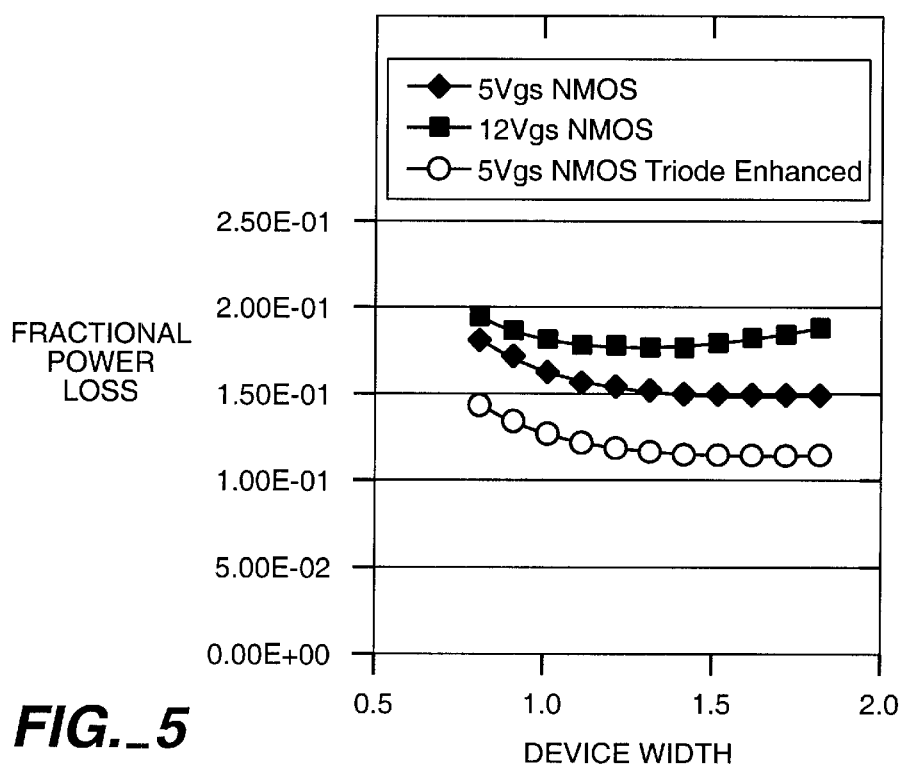
FIG._5

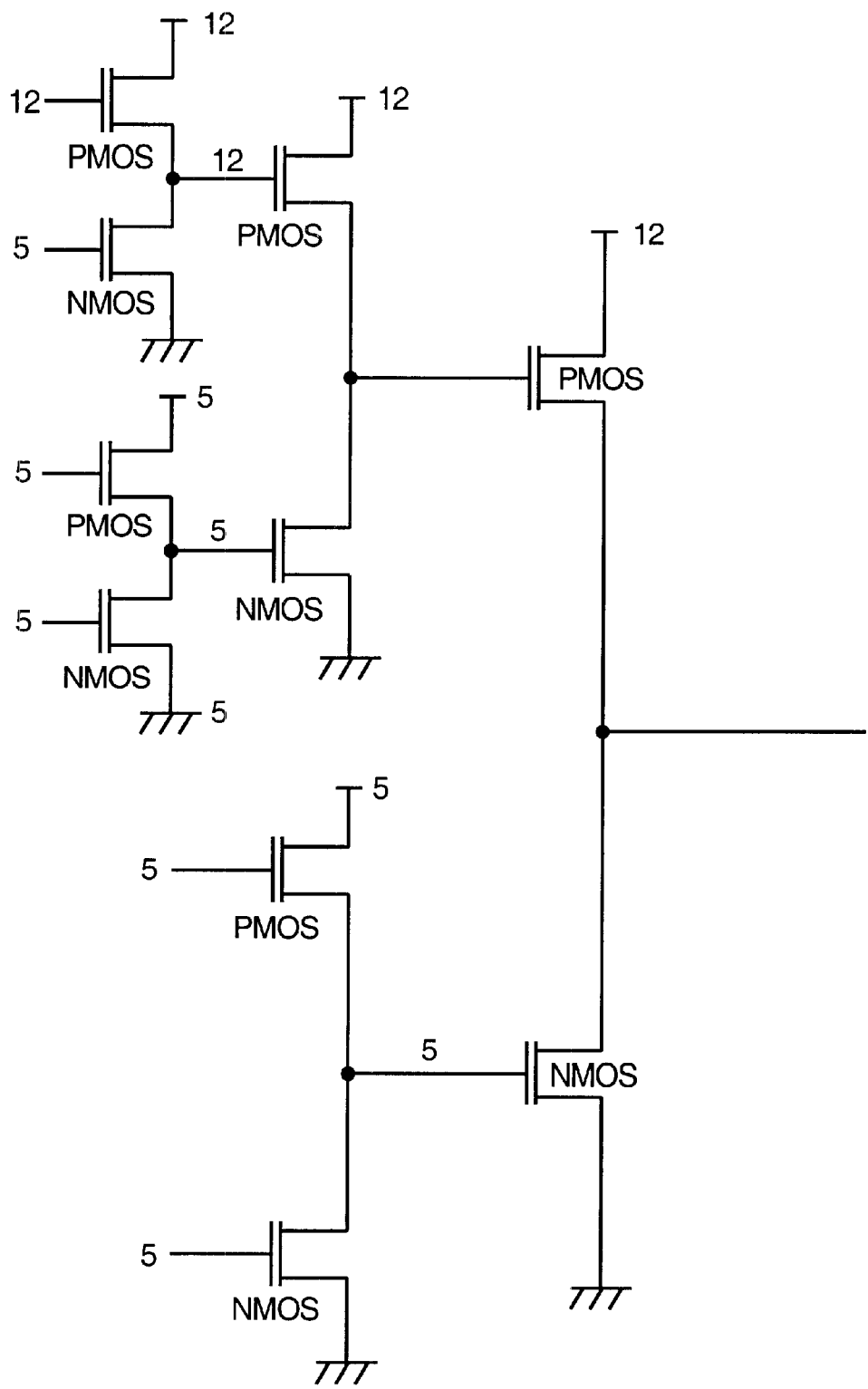
FIG._6

SWITCHING REGULATOR WITH MULTIPLE POWER TRANSISTOR DRIVING VOLTAGES

BACKGROUND

The present invention relates generally to voltage regulators, and more particularly to a switching regulator that includes multiple power transistors.

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or simply "switching regulators") are known to be an efficient type of DC to DC converter. A switching regulator generates an output voltage by converting an input DC voltage into a high frequency voltage, and filtering the high frequency input voltage to generate the output DC voltage. Specifically, the switching regulator includes a switch for alternately coupling and decoupling an input DC voltage source, such as a battery, to a load, such as an integrated circuit. An output filter, typically including an inductor and a capacitor, is coupled between the input voltage source and the load to filter the output of the switch and thus provide the output DC voltage. A controller, such as a pulse width modulator or a pulse frequency modulator, controls the switch to maintain a substantially constant output DC voltage.

In a conventional integrated switching regulator, the power switches are driven with on and off signals that have the same voltage as the voltage supply and ground, respectively. In addition, the transistors in conventional switching regulators are designed for reliable behavior under steady-state saturation conditions. Unfortunately, the long gate lengths required for reliable behavior result in large gate capacitance and resistance, resulting in large power losses and low efficiency. Moreover, driving the gates of transistors between the voltage supply voltage and ground may not be the most efficient solution.

As the complexity of integrated circuits and the power requirements for portable devices grow, there will be increasing pressure for switching regulators with extremely high efficiency. Therefore it would be advantageous to develop a switching regulator that operates with increased efficiency.

SUMMARY

In one aspect, the invention is directed to a voltage regulator. The voltage regulator has an input terminal, an output terminal, a first transistor connecting the input terminal to an intermediate terminal, a second transistor connecting the intermediate terminal to ground, a controller that drives the first and second transistors to alternately couple the intermediate terminal between the input terminal and ground, and a filter disposed between the input terminal and the output terminal to provide a substantially DC voltage at the output terminal. The controller drives the first transistor with a first gate voltage and drives the second transistor with a second, different gate voltage.

Implementations of the invention may include the following features. The first transistor may be a PMOS transistor, and the second transistor may be an NMOS transistor. The first voltage may be larger than the second voltage. The first voltage may be substantially equal to an input voltage at the input terminal. The second gate voltage may be compatible with a logic voltage, and the first gate voltage may be greater than the logic voltage. The first transistor may include a first gate oxide layer, the second transistor may include a second gate oxide layer, and the first gate oxide layer may be thicker than the second gate oxide layer. The controller may include a first plurality of transistors in a drive train of the first transistor and a second plurality of transistors in a drive train of the second transistor. The second plurality of transistors maybe driven with the second gate voltage. The first plurality of transistors may include a third transistor driven with the first gate voltage and a fourth transistor driven with the second gate voltage.

In another aspect, the invention is directed to a voltage regulator that has an input terminal, an output terminal, a transistor to intermittently couple the input terminal to the output termninal, and a filter disposed between the input terminal and the output terminal to provide a substantially DC voltage at the output terminal. The transistor includes a source, a drain, and a gate, and the transistor has a channel length between the source and the drain which is less than a channel length required for reliable behavior under steady state saturation conditions.

Implementations of the invention may include the following features. The channel length may be about 1 micron. The channel length may be shorter than a channel length specified for standard hot electron specification of 10% degradation in a one year period of operation. The transistor may be fabricated using one or more of process proximity correction and phase shift mask technology.

In another aspect, the invention is directed to a voltage regulator that has an input terminal, an output terminal, a first transistor connecting the input terminal to an intermediate terminal, a second transistor connecting the intermediate terminal to ground, a controller that drives the first and second transistors to alternately couple the intermediate terminal between the input terminal and ground, and a filter disposed between the input terminal and the output terminal to provide a substantially DC voltage at the output terminal. The first transistor includes a first gate oxide layer, and the second transistor includes a second gate oxide layer that is thinner than the first gate oxide layer.

Implementations of the invention may include the following features. The first transistor may be a PMOS transistor and the second transistor may be an NMOS transistor. The controller may drive the first transistor with a first gate voltage and drive the second transistor with a second, different gate voltage. The first voltage may be larger than the second voltage.

Advantages of the invention may include the following. The switching regulator may have a high power conversion efficiency. The power transistors of the switching regulator may be located on an integrated circuit (IC) chip, thereby reducing parasitic inductance and capacitance. The switching regulator may use fewer components, thus using less surface area of the IC chip, while maintaining a fast response and a low cost. In addition, the regulator may exhibit a smaller form factor and size, and may accept an input voltage that is compatible with external integrated circuits.

Other features and advantages of the invention will become apparent from the following description, including the drawings and the claims.

BRIEF DESCRIPTION OF THE DRAWINGS

FIG. 1 is a block diagram of a buck switching regulator.

FIG. 2 is a timing diagram for the gate voltage at the first transistor in the switching circuit of the switching regulator of FIG. 1.

FIG. 3 is a timing diagram for the gate voltage at the second transistor in the switching circuit of the switching regulator of FIG. 1.

FIG. 4 is a schematic cross-sectional view of a switching circuit from the switching regulator of FIG. 1.

FIG. 5 is a graph showing the power loss of a switching circuit as a function of gate length and input voltage scheme.

FIG. 6 is a schematic diagram of some of the components of the drivers for the switching circuit in the switching regulator.

DETAILED DESCRIPTION

Although the switching regulator illustrated and discussed has a buck converter topology, the invention is also applicable to other voltage regulator topologies, such as a boost converter or a buck-boost converter, and to rf output amplifiers.

Referring to FIG. 1, a switching regulator 10 is coupled to a first high DC input voltage source 12, such as a battery, by an input terminal 20. The switching regulator 10 is also coupled to a load 14, such as an integrated circuit, by an output terminal 24. The switching regulator 10 serves as a DC-to-DC converter between the input terminal 20 and the output terminal 24. The switching regulator 10 includes a switching circuit 16 which serves as a power switch for alternately coupling and decoupling the input terminal 20 to an intermediate terminal 22. The switching circuit 16 includes a rectifier, such as a switch or diode, coupling the intermediate terminal 22 to ground. Specifically, the switching circuit 16 may include a first transistor 40 having a source connected to the input terminal 20 and a drain connected to the intermediate terminal 22 and a second transistor 42 having a source connected to ground and a drain connected to the intermediate terminal 22. The first transistor 40 may be a P-type MOS (PMOS) device, whereas the second transistor 42 may be an N-type MOS (NMOS) device.

The intermediate terminal 22 is coupled to the output terminal 24 by an output filter 26. The output filter 26 converts the rectangular waveform of the intermediate voltage at the intermediate terminal 22 into a substantially DC output voltage at the output terminal 24. Specifically, in a buck-converter topology, the output filter 26 includes an inductor 44 connected between the intermediate terminal 22 and the output terminal 24 and a capacitor 46 connected in parallel with the load 14. During a PMOS conduction period, the first transistor is closed, and the source 12 supplies energy to the load 14 and the inductor 44 via the first transistor 40. On the other hand, during an NMOS conduction period, the second transistor 42 is closed, and current flows through the second transistor 42 as energy is supplied by the inductor 44. The resulting output voltage $V_{out}$ is a substantially DC voltage.

The switching regulator also includes a controller 18, a PMOS driver 80 and an NMOS driver 82 for controlling the operation of the switching circuit 16. A first control line 30 connects the PMOS transistor 40 to the PMOS driver 80, and a second control line 32 connects the NMOS transistor 42 to the NMOS driver 82. The PMOS and NMOS drivers are connected to the controller 18 by control lines 84 and 86, respectively. The controller 18 causes the switching circuit 16 to alternate between PMOS and NMOS conduction periods so as to generate an intermediate voltage $V_{int}$ at the intermediate terminal 22 that has a rectangular waveform. The controller 16 can also include a feedback circuit (not shown) which measures the output voltage and the current passing through the output terminal. Although the controller 18 is typically a pulse width modulator, the invention is also applicable to other modulation schemes, such as pulse frequency modulation.

The power transistor drivers 80 and 82 are connected to both the high DC input voltage source 12, and to a low DC input voltage source 28. The low DC input voltage source 28 may be a separate power source, or it may be generated from the high DC voltage source 12. The low voltage source 28 generates a control supply voltage, $V_{control}$, that is compatible with conventional input voltages, e.g., 3.3 or 5 volts, that can be used to drive other circuits in the voltage regulator, such as the controller 18, and other integrated circuits in the electronic device. On the other hand, the high voltage source 12 generates a significantly higher input voltage $V_{in}$, that is often preferred for distributing high power levels, e.g., 12 to 48 volts. Alternatively, the input voltage values can be chosen to be optimized for low power.

The PMOS driver 80 drives the gate voltage $V_{gate1}$ on the control line 30 between a low voltage $V_{low}$ to close the PMOS transistor 40 and a high voltage $V_{high1}$ to open the PMOS transistor 40. Conversely, the NMOS driver 82 drives the gate voltage $V_{gate2}$ on the control line 32 between a high voltage $V_{high2}$ to close the NMOS transistor 42 and a low voltage $V_{low2}$ to open NMOS transistor 42.

Traditionally, the PMOS driver 80 and NMOS driver 82 simply drive the control lines 30 and 32 through the full swing of the input voltage, i.e., from zero to $V_{in}$, in order to switch the PMOS transistor 40 and NMOS transistor 42. Thus, in a conventional switching regulator, the voltage used to close the PMOS transistor 40 is the same as the voltage used to open the NMOS transistor, i.e., $V_{low1}=V_{low2}$, and the voltage used to open the PMOS transistor 40 is the same as the voltage used to close the NMOS transistor, i.e., $V_{high1}=V_{high2}$.

However, as will be explained in greater detail below, the drivers 80 and 82 use both the high and low voltage sources 12 and 28 in order to drive the PMOS and NMOS transistors 40 and 42 with asymmetric gate voltages, i.e., the gate voltages $V_{gate1}$ and $V_{gate2}$ on the first and second control lines 30 and 32 can swing through different ranges to control the transistors 40 and 42. Thus, the voltage $V_{low1}$ to close the PMOS transistor 40 need not equal the voltage $V_{low2}$ to open the NMOS transistor, and the voltage $V_{high1}$ to open the PMOS transistor 40 need not equal the voltage $V_{high2}$ to close the NMOS transistor.

Referring to FIGS. 2 and 3, in one implementation, the gate voltage $V_{high2}$ applied on the second control line 32 to close the NMOS transistor 42 can be less than the gate voltage $V_{high1}$ applied on the first control line 30 to open the PMOS transistor 40. Specifically, the first gate voltage $V_{high1}$ can be about the same as the input voltage $V_{in}$, and the second gate voltage $V_{high2}$ can be about the same as the control supply voltage $V_{control}$. On the other hand, the control lines 30 and 32 can both be driven to ground to close the PMOS transistor 40 and open the NMOS transistor 42.

The power loss due to switching of the transistors during the PMOS and NMOS cycles is given by the following equations, respectively:

$$P_{loss}(PMOS) \approx C_{gate} \cdot \left[ \frac{D \cdot I_{out}^2}{C_{gate}^2 \cdot \mu_p \cdot W_p / L_p \cdot (V_{gate} - V_{tp})} + \right.$$

-continued $$(W_p \cdot L_p) \cdot f_{switch} \cdot V_{gate}^2 + C_{drain} \cdot f_{switch} \cdot V_{in}^2$$

$$P_{loss}(NMOS) \approx C_{gate} \cdot \left[ \frac{(1-D) \cdot I_{out}^2}{C_{gate}^2 \cdot \mu_n \cdot W_n / L_n \cdot (V_{gate} - V_{tn})} + \right.$$

$$(W_n \cdot L_n) \cdot f_{switch} \cdot V_{gate}^2 + C_{drain} \cdot f_{switch} \cdot V_{in}^2$$

where $C_{gate}$ is the capacitance of the gate oxide layer, D is the duty cycle of the switching circuit, $I_{out}$ is the output current, $\mu_p$ and $\mu_d$ are carrier mobilities for the PMOS and NMOS transistors, respectively, $W_p$, $W_f$, $L_p$ and $L_n$ are the width and length of the channel between the source and drain in the PMOS and NMOS transistors, respectively, $V_{gate}$ is the gate voltage, $V_{tn}$ and $V_{tp}$ are the threshold voltages for the PMOS and NMOS transistors, respectively, $f_{switch}$ is the switching frequency, $C_{drain}$ is the parasitic capacitance of the drain (assumed to be equal for both the PMOS and NMOS transistors), and $V_{in}$ is the input voltage. The duty cycle D is equal to $V_{out}/V_{in}$. The first term in the brackets represents the transistor resistive losses, the second term in the brackets represents the gate capacitive losses, and the third term (outside the brackets) represents the switching losses due to capacitance on intermediate node 22, which will include the junction capacitance of the switches.

As can be seen from the above equations, the overall power dissipation in the device depends on the gate capacitance $C_{gate}$ and the gate voltage $V_{gate}$. By reducing the maximum gate voltage $V_{gate}$ on the transistor, power efficiency can be improved. In addition, by reducing the voltage swing across the transistor, the gate oxide thickness can be decreased while maintaining reliable operation. It should be noted that the optimum gate voltage value and corresponding capacitance need not equal the voltages from the voltage sources 12 and 28 to minimize power losses in the device.

In general, for the NMOS power device, the lowest power losses can be achieved by using the thinnest gate oxide achievable that can reliably withstand voltage transients that occur between the drain and gate of the device. The junction voltage breakdown threshold, however, should exceed the highest voltage level the device will experience during normal operations. In short, a thinner gate oxide NMOS device can be driven with a lower voltage than the input voltage $V_{in}$ from the voltage source 12 to achieve a low channel resistance while minimizing capacitive gate switching losses. This improves the power efficiency as long as the device is constructed so as to not suffer junction damage at the drain. For example, the NMOS transistor 42 can be driven with a conventional logic control voltage, e.g., $V_{control}$=5V.

In principle, a similar implementation can be employed for a PMOS device. However, for the PMOS transistor 40, the gate voltage should be equal to the input voltage $V_{in}$ during the NMOS conduction period to ensure no shoot-through current, whereas the gate voltage need not be, zero or ground during the PMOS conduction period. For example, given a power regulator targeted for load applications with $V_{in}$=12V, providing a $V_{out}$=1.5V with efficient voltage conversion would entail driving the PMOS transistor 40 between 12 and 7 volts. However, the driving circuitry required to generate the additional bias levels (7 volts in the above example) at the speeds required by the application might obviate any power savings with the mixed voltage device scheme. Thus, thus it may be more efficient to have the PMOS transistor 40 operate with the gate voltage varying between the input voltage $V_{in}$ and ground. In addition, the driving circuitry will incur costs in silicon area and design time. Consequently, the choice of gate oxide thickness in the PMOS transistor will be dictated both by the ratio of the output voltage $V_{out}$ to the input voltage $V_{in}$ and by the power dissipated in the drivers required to drive the PMOS gate through the appropriate voltage levels. The closer the output voltage is to the input voltage, the larger the resistive losses through the PMOS device, making it more amenable to incurring an increased power loss in a reduced swing driver for its low voltage gate. This overall system optimization is applicable to all power conversion topologies, and the exact trade-off when to use a thin-oxide PMOS device is a function of the duty cycle of the system as determined by the ratio of the output voltage to the input voltage.

Referring to FIG. 4, the switching circuit 16 can be fabricated on a p-type substrate 50. The PMOS transistor 40 includes an n-doped drain region 52, an n-doped source region 54, and a gate 56 with a gate oxide layer 58. The NMOS transistor 40 includes an n-type well 60, a p-doped drain region 62, a p-doped source region 64, and a gate 66 with a gate oxide layer 68. Of course, the switching circuit could be fabricated on an n-type substrate, in which case the PMOS transistor would include a p-doped well. In the symmetric transistor shown in FIG. 4, resistive implants are formed on both the drain and source of the transistors. In an asymmetric transistor (not illustrated), a resistive implant is formed only on the drain of the device. The thickness $T_2$ of the gate oxide layer 68 of the NMOS transistor can be less than the thickness $T_1$ of the gate oxide layer 58 of the PMOS transistor 40 without shorting through the gate oxide layer due to the lower gate voltage at the NMOS transistor. The modified drain structure also helps distribute the electric field between the drain and gate when the device is off, allowing the use of a thinner gate oxide than that required to withstand the full voltage of the unregulated supply. This permits the reduction of the gate capacitance of the NMOS transistor, resulting in a higher power efficiency.

A separate power optimization strategy is to tailor the gate length to minimize both the resistive and capacitive loss components while maintaining a high device reliability. As noted in the power loss equations, both the resistive and gate capacitive losses are directly proportional to gate length. In conventional devices, the minimum gate lengths for both high voltage and conventional CMOS devices are chosen to ensure "stable and reliable" behavior under steady state saturation conditions, e.g., a 10% degradation due to hot electron threshold voltage and saturation current shifts in one year of operation. However, the transistors 40, 42 in the switching circuit 16 operate heavily in the triode region and are only saturated during short switching transitions (the nearly vertical regions on FIGS. 2 and 3). In addition, such power devices drive inductive rather than capacitive loads. The sizing required to attain efficient devices results in current densities well below those present when driving purely capacitive loads, where the current densities are a function of the device on resistance rather than the inductor current. Consequently, the gate channel lengths $L_1$ and $L_2$ can be further reduced, as compared to the gate length of conventional devices specified for "stable and reliable" behavior.

The limit for gate length optimization is set as a function of the amount of margin required when comparing the highest drain to source voltage (Vds) value attainable in the system to the punch-through voltage of the device at a given gate length. Active clamp circuitry can be employed in order to suppress voltage transients in order to minimize punch-through susceptibility.

In a CMOS process with embedded high-voltage capability, the optimal gate length value is likely not to push the lithographic capabilities of the process due to the high VDS values the high voltage power MOSFETs can experience. The optimum gate length for power MOSFETs in a standard CMOS process might push its lithographic limits. Advanced imaging techniques, such as process proximity correction (PPC) and phase shift mask technology can be used to extend the resolution of the system. This capability is further enhanced by the fact that the power MOSFETs essentially act as switches in the system. The shorter the gate length, the more efficient the switch. Thus, linewidth variability from wafer to wafer is not as critical, since a reduced gate length device with larger variability than the standard minimum dimension always results in a better implementation of the device.

FIG. 5 shows a graph of fractional power loss, in percentage, as a function of device width. As shown, with the NMOS transistor 42 operating with a gate voltage $V_{gate}$ of 5 volts exhibits better power efficiency than an NMOS transistor operating with a gate voltage $V_{gate}$ of 12 volts. Furthermore, an NMOS transistor with a reduced gate length exhibits even better power efficiency.

Any controller transistor located in the drive train of an NMOS transistor may use the lower voltage input. For example, referring to FIG. 6, all the transistors that are used to control the second transistor 42 may be driven by the lower gate voltage and be fabricated with thin gate oxide layers. In addition, in the drive train of the first transistor 40, any transistor that drives an NMOS transistor may itself be driven by the lower gate voltage. Thus, most of the controller 18 operates at a lower voltage, significantly reducing power consumption of the controller 18 and improving the power efficiency of the switching regulator.

The invention has been described in terms of particular embodiments. Other embodiments are within the scope of the following claims.

What is claimed is:

1. A voltage regulator having an input terminal and an output terminal, comprising:
    a first transistor connecting the input terminal to an intermediate terminal, the first transistor including a first gate oxide layer;
    a second transistor connecting the intermediate terminal to ground, the second transistor including a second gate oxide layer;
    a controller that drives the first and second transistors to alternately couple the intermediate terminal between the input terminal and ground, wherein the controller drives the first transistor with a first gate voltage and drives the second transistor with a second, different gate voltage; and
    a filter disposed between the input terminal and the output terminal to provide a substantially DC voltage at the output terminal, the filter including at least one element connecting the intermediate terminal to the output terminal.

2. The voltage regulator of claim 1, wherein the first transistor is a PMOS transistor and the second transistor is an NMOS transistor.

3. The voltage regulator of claim 2, wherein the first gate voltage is larger than the second gate voltage.

4. The voltage regulator of claim 3, wherein the first gate voltage is substantially equal to an input voltage at the input terminal.

5. The voltage regulator of claim 3, wherein the second gate voltage is compatible with a logic voltage.

6. The voltage regulator of claim 5, wherein the first gate voltage is greater than the logic voltage.

7. The voltage regulator of claim 3, wherein the first gate oxide layer is thicker than the second gate oxide layer.

8. The voltage regulator of claim 1, wherein the controller includes a first plurality of transistors in a drive train of the first transistor and a second plurality of transistors in a drive train of the second transistor.

9. The voltage regulator of claim 8, wherein the second plurality of transistors are driven with the second gate voltage.

10. The voltage regulator of claim 8, wherein the first plurality of transistors includes a third transistor driven with the first gate voltage and a fourth transistor driven with the second gate voltage.

11. A voltage regulator having an input terminal and an output terminal, comprising:
    a first transistor connecting the input terminal to an intermediate terminal, the first transistor including a first gate oxide layer;
    a second transistor connecting the intermediate terminal to ground, the second transistor including a second gate oxide layer that is thinner than the first gate oxide layer;
    a controller that drives the first and second transistors to alternately couple the intermediate terminal between the input terminal and ground; and
    a filter disposed between the input terminal and the output terminal to provide a substantially DC voltage at the output terminal, the filter including at least one element connecting the intermediate terminal to the output terminal.

12. The voltage regulator of claim 11, wherein the first transistor is a PMOS transistor and the second transistor is an NMOS transistor.

13. The voltage regulator of claim 12, wherein the controller drives the first transistor with a first gate voltage and drives the second transistor with a second, different gate voltage.

14. The voltage regulator of claim 13, wherein the first voltage is larger than the second voltage.

15. A voltage regulator having an input terminal and an output terminal, comprising:
    a first transistor connecting the input terminal to an intermediate terminal;
    a second transistor connecting the intermediate terminal to ground;
    a controller that drives the first and second transistors to alternately couple the intermediate terminal between the input terminal and ground, wherein the controller drives the first transistor with a first gate voltage and drives the second transistor with a second, different gate voltage; and
    a filter disposed between the input terminal and the output terminal to provide a substantially DC voltage at the output terminal, the filter including at least one element connecting the intermediate terminal to the output terminal;
    wherein the first transistor includes a source, a drain and a gate, and the first transistor has a channel length between the source and the drain which is less than a channel length required for reliable behavior under steady state saturation conditions.

16. A voltage regulator having an input terminal and an output terminal, comprising:
  a first transistor connecting the input terminal to an intermediate terminal;
  a second transistor connecting the intermediate terminal to ground;
  a controller that drives the first and second transistors to alternately couple the intermediate terminal between the input terminal and ground, wherein the controller drives the first transistor with a first gate voltage and drives the second transistor with a second, different gate voltage; and
  a filter disposed between the input terminal and the output terminal to provide a substantially DC voltage at the output terminal, the filter including at least one element connecting the intermediate terminal to the output terminal;
  wherein the second transistor includes a source, a drain and a gate, and the second transistor has a channel length between the source and the drain which is less than a channel length required for reliable behavior under steady state saturation conditions.

17. The voltage regulator of claim 1, wherein the first and second transistors have a double diffused drain structure.

18. The voltage regulator of claim 1, wherein the first and second oxide layers are formed on a surface of a semiconductor.

19. The voltage regulator of claim 1, wherein application of the first gate voltage turns the first transistor on.

20. The voltage regulator of claim 1, wherein application of the second gate voltage turns the second transistor on.

* * * * *

UNITED STATES PATENT AND TRADEMARK OFFICE
CERTIFICATE OF CORRECTION

PATENT NO.    : 6,400,126 B1
DATED         : June 4, 2002
INVENTOR(S)   : Marco A. Zuniga and Charles Nickel It is certified that error appears in the above-identified patent and that said Letters Patent is hereby corrected as shown below:

Column 6,
Line 19, change "PMOS transistor 40" to -- NMOS transistor 42 --;
Line 22, change "NMOS" to -- PMOS --;
Line 26, change "PMOS" to -- NMOS --;
Line 30, change "$T_2$" to -- $T_1$ --;
Line 31, change "68" to -- 58 --;
Line 32, change "$T_1$" to -- $T_2$ --; and change "58" to -- 68 --.

Column 8,
Line 43, after "first" insert -- gate --;
Line 44, after "second" insert -- gate --.

In Sheet 1 of the drawings, FIG._1, element 40 should show a PMOS symbol and element 42 should show an NMOS symbol.
In Sheet 1 of the drawings, FIG._4 should appear as follows:

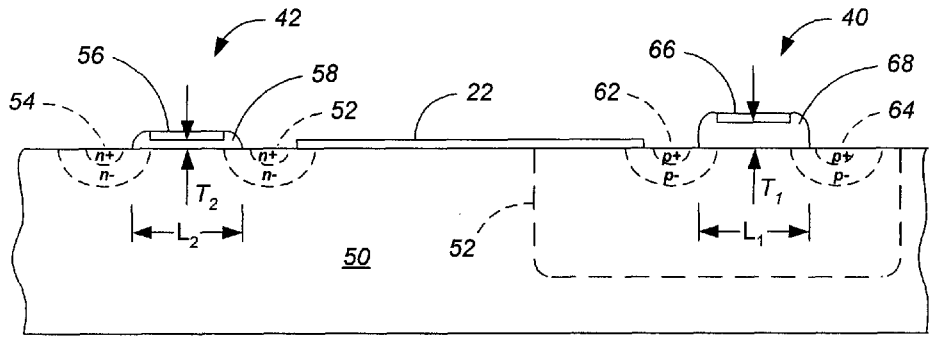

Signed and Sealed this

Fifth Day of August, 2003

JAMES E. ROGAN
*Director of the United States Patent and Trademark Office*

(12) EX PARTE REEXAMINATION CERTIFICATE (8382nd)
United States Patent
Zuniga et al.

(10) Number: US 6,400,126 C1
(45) Certificate Issued: Jul. 5, 2011

(54) SWITCHING REGULATOR WITH MULTIPLE POWER TRANSISTOR DRIVING VOLTAGES

(75) Inventors: Marco A. Zuniga, Dublin, CA (US); Charles Nickel, San Jose, CA (US)

(73) Assignee: Volterra Semiconductor Corporation, Fremont, CA (US)

Reexamination Request:
No. 90/011,103, Jul. 19, 2010

Reexamination Certificate for:
Patent No.: 6,400,126
Issued: Jun. 4, 2002
Appl. No.: 09/475,713
Filed: Dec. 30, 1999

Certificate of Correction issued Aug. 5, 2003.

(51) Int. Cl.
*G05F 1/40* (2006.01)
*G05F 1/10* (2006.01)
*G05F 3/16* (2006.01)
*G05F 1/618* (2006.01)
*G05F 3/08* (2006.01)

(52) U.S. Cl. .......... 323/282; 323/224; 327/437
(58) Field of Classification Search .......... 323/282
See application file for complete search history.

(56) References Cited

U.S. PATENT DOCUMENTS

| 4,291,321 | A | 9/1981 | Pfleiderer et al. |
| 4,906,914 | A | 3/1990 | Ohsawa |
| 5,866,445 | A | 2/1999 | Baumann |
| 5,929,680 | A | 7/1999 | Lim |
| 5,959,442 | A | 9/1999 | Hallberg et al. |
| 6,525,516 | B2 | 2/2003 | Schultz et al. |

OTHER PUBLICATIONS

Anthony John Stratakos, *High Efficiency Low-Voltage DC–DC Conversion for Portable Applications*, Dissertation for Doctor of Philosophy, Fall 1998.

*Primary Examiner*—Pia Tibbits

(57) ABSTRACT

A voltage regulator has an input terminal, an output terminal, a first transistor connecting the input terminal to an intermediate terminal, a second transistor connecting the intermediate terminal to ground, a controller that drives the first and second transistors to alternately couple the intermediate terminal between the input terminal and ground, and a filter disposed between the input terminal and the output terminal to provide a substantially DC voltage at the output terminal. The controller drives the two transistors with different gate voltage, and the two transistors can have different gate oxide layer thicknesses.

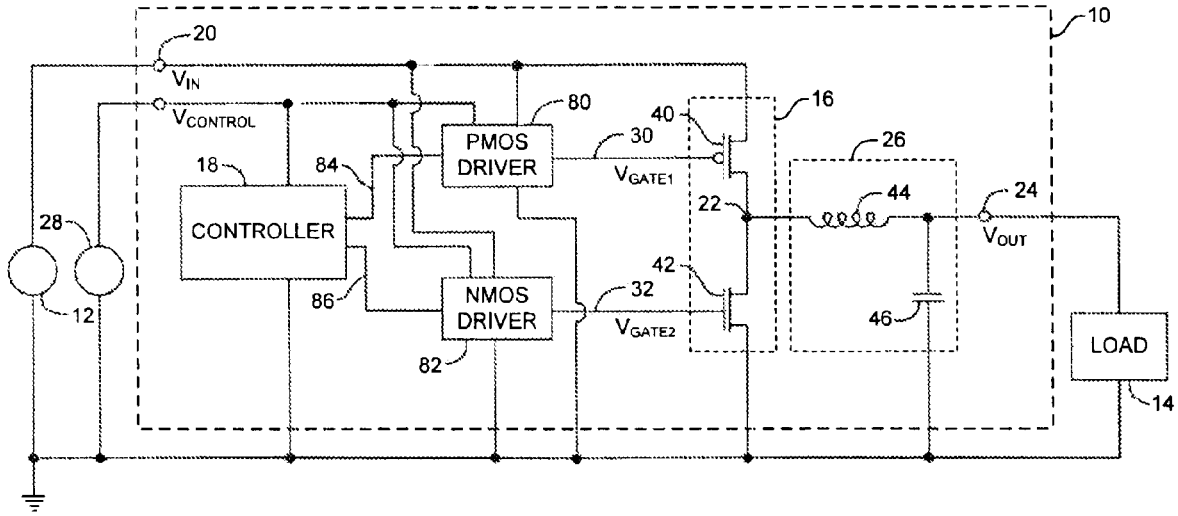

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *